US012561067B2

(12) United States Patent
Schaefer

(10) Patent No.: US 12,561,067 B2
(45) Date of Patent: Feb. 24, 2026

(54) ADDRESS VERIFICATION AT A MEMORY DEVICE

(71) Applicant: Micron Technology, Inc., Boise, ID (US)

(72) Inventor: Scott E. Schaefer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 92 days.

(21) Appl. No.: 17/964,706

(22) Filed: Oct. 12, 2022

(65) Prior Publication Data

US 2024/0126447 A1     Apr. 18, 2024

(51) Int. Cl.
*G06F 3/06* (2006.01)

(52) U.S. Cl.
CPC .......... *G06F 3/0619* (2013.01); *G06F 3/0653* (2013.01); *G06F 3/0673* (2013.01)

(58) Field of Classification Search
None
See application file for complete search history.

(56) References Cited

U.S. PATENT DOCUMENTS 10,944,429 B1 * 3/2021 Yang ..................... H03M 13/13
11,907,559 B1 * 2/2024 Admon ................. G06F 3/0622

| | | | | |
|---|---|---|---|---|
| 2003/0018936 A1 * | 1/2003 | Ryan | ..................... | G06F 11/167 |
| | | | | 714/E11.057 |
| 2008/0082869 A1 * | 4/2008 | Sugawara | .......... | G06F 11/1016 |
| | | | | 714/702 |
| 2008/0235558 A1 * | 9/2008 | Normoyle | .......... | G06F 11/1016 |
| | | | | 714/768 |
| 2012/0066567 A1 * | 3/2012 | Moyer | ................ | G06F 11/1076 |
| | | | | 714/763 |
| 2016/0055053 A1 * | 2/2016 | Trantham | ............ | G06F 11/1012 |
| | | | | 714/807 |
| 2020/0341686 A1 * | 10/2020 | Lee | ..................... | G06F 3/0655 |
| 2021/0013903 A1 * | 1/2021 | Vanaparthy | ........ | H03M 13/1102 |
| 2022/0416813 A1 * | 12/2022 | Ishibashi | ................ | G06F 11/10 |
| 2023/0053384 A1 * | 2/2023 | Uribe | .................. | G06F 11/1076 |
| 2023/0251930 A1 * | 8/2023 | Nemati | ................. | G06F 11/076 |
| | | | | 714/764 |
| 2023/0280930 A1 * | 9/2023 | Song | ..................... | G06F 3/0604 |

* cited by examiner

*Primary Examiner* — Jared I Rutz
*Assistant Examiner* — Alexander J Yoon
(74) *Attorney, Agent, or Firm* — Holland & Hart LLP

(57)     ABSTRACT

Methods, systems, and devices for address verification at a memory device are described. The memory device may receive a read command for a read address. Based on the read command, the memory device may read data from the read address and a first set of error detection bits that is based on a write address associated with the data. The memory device may generate, based on the first set of error detection bits and a second set of error detection bits that is based on the read address, an address match signal that indicates whether the read address matches the write address. And the memory device may provide the data and an indication of the address match signal to a host device.

19 Claims, 6 Drawing Sheets

305 — Receive write command and write address

310 — Receive or generate first set of error detection bits

315 — Store first set of error detection bits

320 — Receive read command and read address

325 — Receive or generate second set of error detection bits

330 — Compare sets of error detection bits

335 — Generate address match signal

340 — Communicate address match bit to host device

300

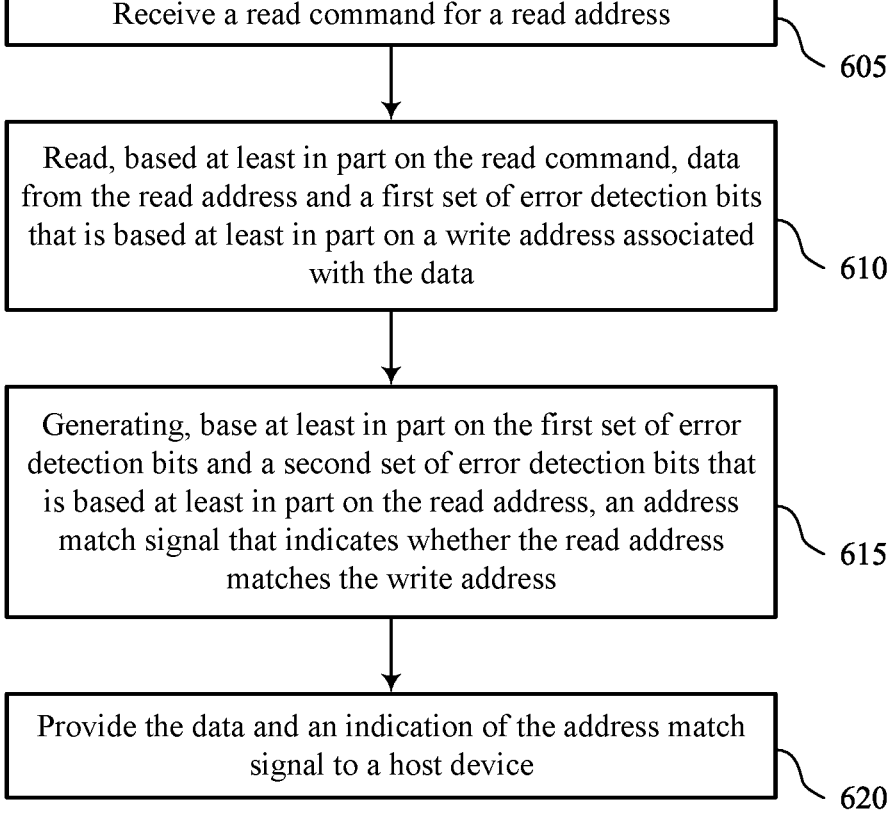

Receive a read command for a read address

605

Read, based at least in part on the read command, data from the read address and a first set of error detection bits that is based at least in part on a write address associated with the data

610

Generating, base at least in part on the first set of error detection bits and a second set of error detection bits that is based at least in part on the read address, an address match signal that indicates whether the read address matches the write address

615

Provide the data and an indication of the address match signal to a host device

ADDRESS VERIFICATION AT A MEMORY DEVICE

FIELD OF TECHNOLOGY

The following relates to one or more systems for memory, including address verification at a memory device.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIG. 6 illustrates a flowchart showing a method or methods that support address verification at a memory device in accordance with examples as disclosed herein.

DETAILED DESCRIPTION

A host device may store information in a memory device by instructing the memory device to write the information to memory cells at an address of the memory device. To retrieve stored information from the memory device, the host device may instruct the memory device to read the information from the memory cells at the address. But in some cases, the memory device may inadvertently store information at, or read information from, the wrong address (e.g., a different address than the address indicated by the host device). In such a scenario, the memory device may unintentionally return incorrect data to the host device, and the host device may unintentionally process the incorrect data, which may negatively impact system performance.

According to the techniques described herein, a memory device may generate, and communicate to a host device, an address match signal that indicates whether the write address for a set of data matches (e.g., is equal to, is the same as) the read address for the set of data. To generate the address match signal, the memory device may store a first set of error detection bits (e.g., one or more bits) that is based on the write address for a set of data. Upon reading the set of data, the memory device may compare the first set of error detection bits with a second set of error detection bits (e.g., one or more bits) that is based on the read address for the set of data. The address match signal may be generated based on the comparison of the first set of error detection bits with the second set of error detection bits, and may indicate whether the write address matches the read address. The memory device may provide the address match signal to the host device so that the host device is able to determine whether the data associated with the address match signal is the correct data requested by the host device, among other benefits.

Features of the disclosure are initially described in the context of systems and memory devices as described with reference to FIGS. 1 and 2. Features of the disclosure are described in the context a process flow and a logic circuit as described with reference to FIGS. 3 through 4. These and other features of the disclosure are further illustrated by and described with reference to an apparatus diagram and flowcharts that relate to address verification at a memory device as described with reference to FIGS. 5 through 6.

Figure 1:
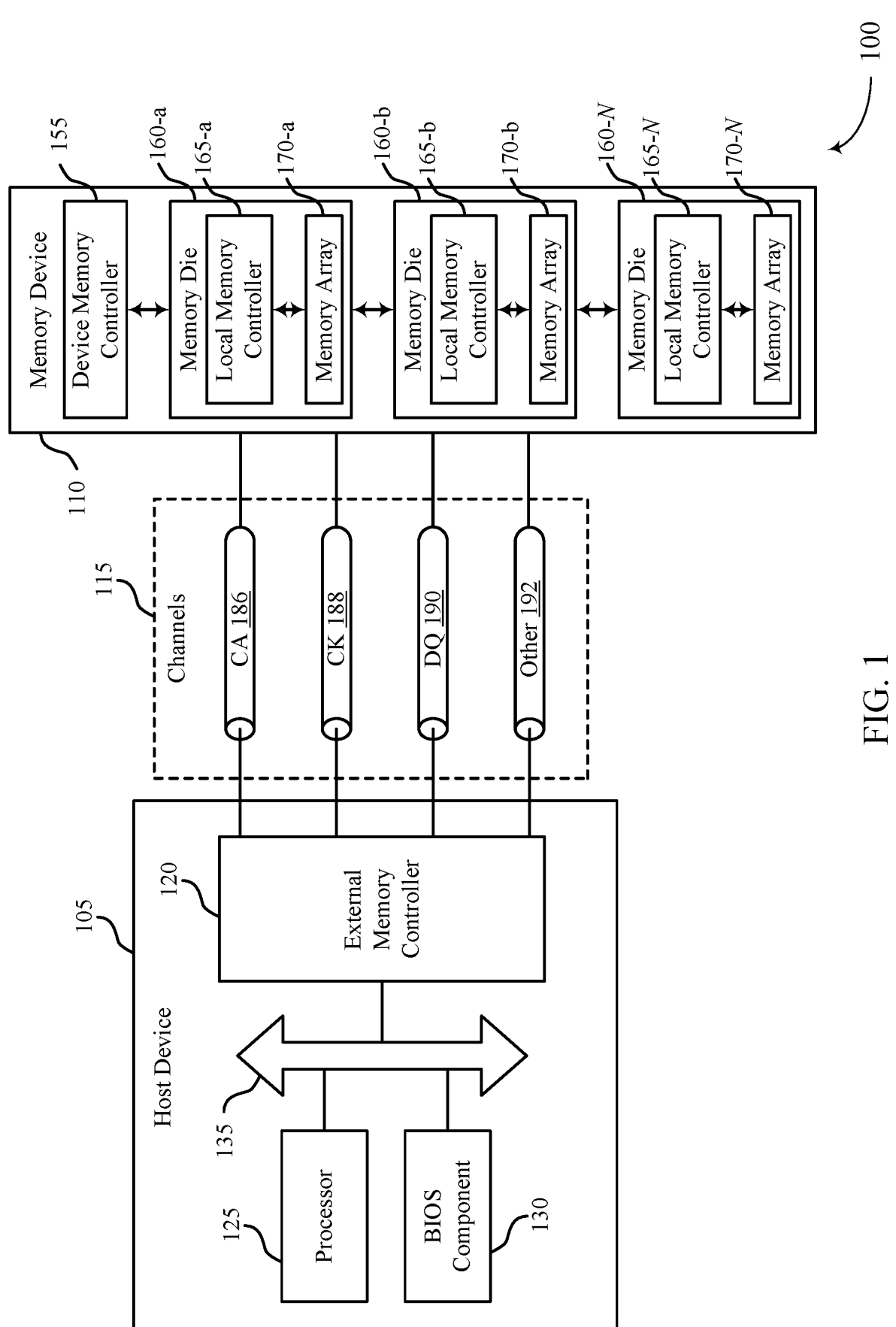
FIG. 1 illustrates an example of a system that supports address verification in accordance with examples as disclosed herein.

FIG. 1 illustrates an example of a system 100 that supports address verification at a memory device in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

A memory device may use an error correction technique to detect and potentially correct errors in information stored in the memory device. For example, a memory device may use an error correction code (ECC) scheme to detect and correct errors that arise in stored codewords. A codeword may refer to a combination of data bits and parity bits that are generated based on the data bits. For example, each parity bit in a codeword may be generated by exclusive-ORing (XORing) a subset of the data bits according to the error correction code.

A host device may instruct a memory device to store the data in a codeword at write address, which may refer to the address associated with a write command for the data. Later, the host device may instruct the memory device to read the data by communicating a read address to the memory device, where a read address may refer to the address associated with a read command for the data. But the host device may be unable to determine whether the data returned by the memory device is the data that the host device previously stored at the memory device. For example, the data returned by the memory device may be incorrect data if the memory device inadvertently wrote the data to a different address than the write address, or if the memory device inadvertently read the data from a different address than the read address.

According to the techniques described herein, a memory device 110 may use error detection bits to generate an address match signal that indicates whether the write address and read address used by the memory device to store and read data are the same. In response to a write command associated with a write address for data, the memory device 110 may store a first set of error detection bits that is based on (e.g., generated from, a function of) the write address. In response to a read command associated with a read address for the data, the memory device 110 may compare the first set of error detection bits with a second set of error detection bits that is based on (e.g., generated from, a function of) the read address. The memory device 110 may generate the address match signal based on the comparison of the first set of error detection bits and the second set of error detection bits. In some examples, the memory device 110 may provide the address match signal to the host device 105 so that the host device 105 can determine whether the memory device 110 returned the correct data requested by the host device 105.

Figure 2:
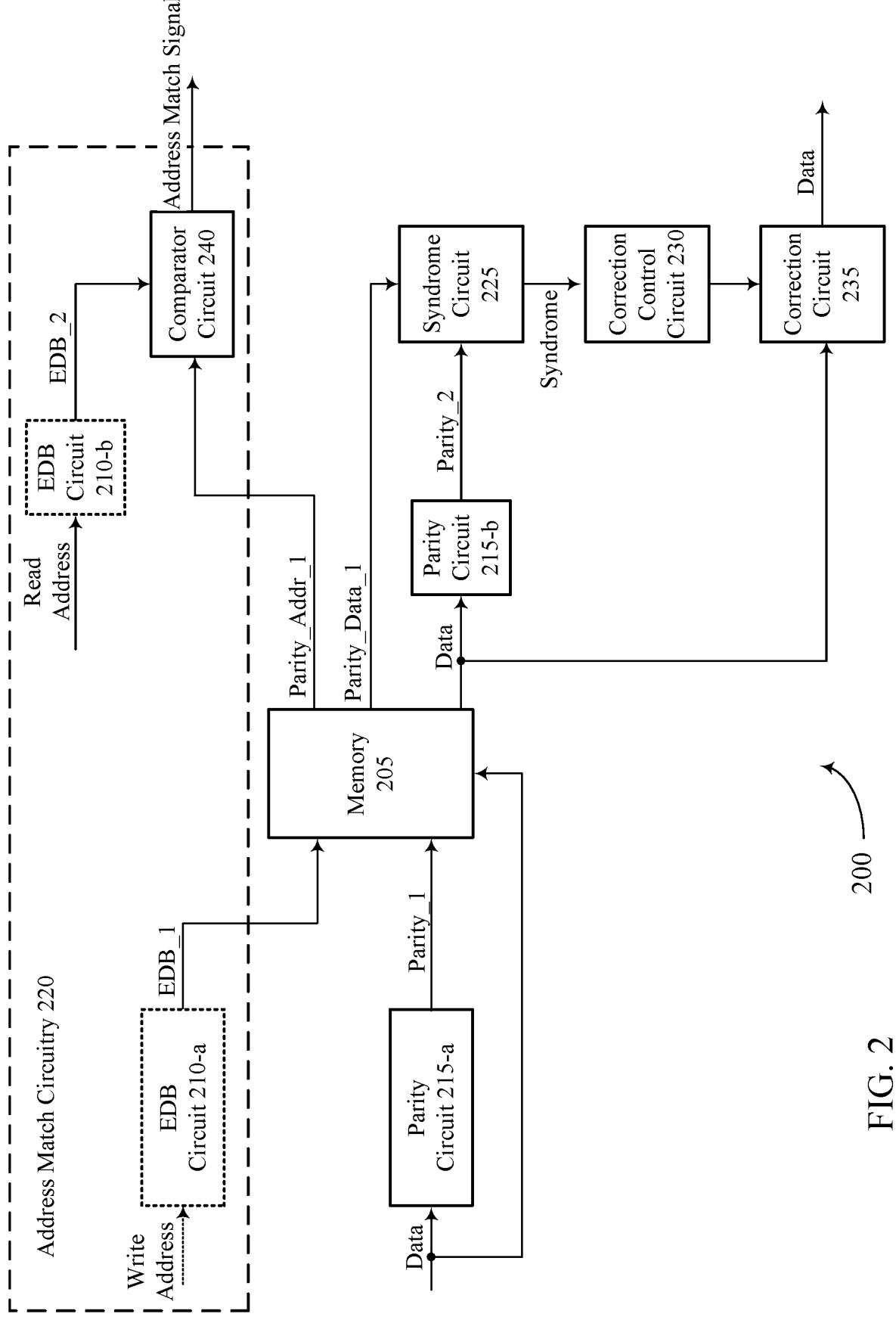
FIG. 2 illustrates an example of a memory device that supports address verification in accordance with examples as disclosed herein.

FIG. 2 illustrates an example of a memory device 200 that supports address verification in accordance with examples as disclosed herein. The memory device 200 may be an example of a memory device 110 as described with reference to FIG. 1. The memory device 200 may generate (e.g., via the address match circuitry 220) an address match signal that indicates whether the write address for a set of data matches the read address for the set of data. The memory device 200 may also implement an ECC scheme for the set of data that allows the memory device 200 to detect and correct errors in the codeword that includes the set of data.

At a high level, the memory device 200 may store in the memory 205 a first set of error detection bits that is based on the write address for a set of data. The first set of error detection bits may be received from a host device or may be generated by the memory device 200. In response to a read command for the set of data, the memory device 200 may generate an address match signal for the set of data by comparing the first set of error detection bits with a second set of error detection bits that is based on a read address for the set of data. The second set of error detection bits may be received from the host device or generated by the memory device 200, among other options. The memory device 200 may provide the address match signal to the host device so that the host device can determine whether the set of data returned by the memory device 200 is the data requested by the host device.

The memory device 200 may include a parity circuit 215-a that is configured to generate a first set of parity bits (Parity_1) for a set of data received from a host device. The first set of parity bits may be generated based on the set of data (e.g., by XORing various combinations of the data bits). The memory device 200 may store the set of data and the first set of parity bits (collectively referred to as a codeword) in the memory 205. The memory device 200 may store the codeword by writing the codeword to the memory cells associated with a write address indicated by the host device.

In some examples, the memory device 200 may use an ECC scheme that uses a first quantity of parity bits to protect a greater quantity of data bits compared to other ECC schemes. In general, parity bits may be packaged in groups of eight. So, the memory device 200 may support use of greater than eight bits, such as sixteen parity bits, to protect 256 data bits even if codeword protection is enabled by fewer than sixteen parity bits. For instance, use of nine or more of the sixteen available parity bits may enable detection and correction of single-bit errors (SBEs), with higher quantities of parity bits providing higher levels of diagnostic coverage (e.g., detection) of multi-bit errors (MBEs). As an illustration, use of nine parity bits may allow the memory device 200 to detect 49.8% of multi-bit errors, use of ten parity bits may allow the memory device 200 to detect 74.9% of multi-bit errors, and so on and so forth as illustrated in Table 1.

TABLE 1

MBE Diagnostic Coverage for Different Quantities of Parity Bits

| | # of parity bits | | | | | | | |
|---|---|---|---|---|---|---|---|---|
| | 9 | 10 | 11 | 12 | 13 | 14 | 15 | 16 |
| % of MBEs detected | ~50% | ~75% | ~89% | ~94% | ~97% | ~98% | ~99% | ~100% |

In some examples, the memory device 200 may use a subset of the available parity bits to protect data and may use the remaining parity bits as error detection bits. For example, the memory device 200 may use twelve of the available parity bits for the ECC scheme and may use the remaining four parity bits as error detection bits. Higher quantities of error detection bits may provide higher levels of diagnostic coverage of address mismatches. For example, use of one error detection bit may allow the memory device 200 to detect 50% of address mismatches, use of two error detection bits may allow the memory device 200 to detect 75% of address mismatches, and so on and so forth as illustrated in Table 2.

TABLE 2

Address Mismatch Diagnostic Coverage for Different Quantities of Error Detection Bits

| | # of error detection bits | | | | | | | |
|---|---|---|---|---|---|---|---|---|
| | 7 | 6 | 5 | 4 | 3 | 2 | 1 | 0 |
| % of address mismatches detected | ~99% | ~98% | ~97% | ~87% | ~83% | ~75% | ~50% | ~0% |

Use of remaining parity bits as error detection bits may reduce the overhead, circuitry, or both that may otherwise be associated with generating the address match signal. The host device may use a default ratio of parity bits to error detection bits or may select (e.g., upon power-up, so the circuitry can be appropriately configured) a ratio of parity bits to error detection bits based on the reliability requirements of the host device.

In some examples, the memory device 200 may include an error detection bit (EDB) circuit 210-*a* that is configured to generate a first set of error detection bits (EDB_1) based on the write address for the set of data. In some examples, the first set of error detection bits may be parity bits that are generated by XORing the bits of the write address. In some examples, the first set of error detection bits may be cyclic redundancy check (CRC) bits that are generated by dividing the bits of the write address by another set of bits that represents a polynomial. So, the first set of error detection bits may be based on the write address in that the logic values of the first set of error detection bits may be a function of the logic values of the bits of the write address. Accordingly, the first set of error detection bits may represent the write address.

Due to the different diagnostic coverage provided by CRC bits and parity bits, the use of parity bits or CRC bits for the error detection bits may be based on various factors, including the length of the addresses (e.g., the quantity of bits per address) used by the memory device 200 and the quantity of error detection bits used by the memory device 200. For example, if the memory device 200 uses 32-bit addresses and five or more error detection bits, the memory device 200 may use parity bits as the error detection bits. If the memory device 200 uses 32-bit addresses and five or less error detection bits, the memory device 200 may use CRC bits as the error detection bits.

In an alternative, the memory device 200 may receive the first set of error detection bits (EDB_1) from the host device (rather than the memory device 200 generating the first set of error detection bits). In such an example, the address match circuitry 220 may omit or disable the error detection bit circuit 210-*a*. Receiving the first set of error detection bits from the host device, rather than generating the first set of error detection bits, may allow the memory device 200 to detect address mismatches that arise due to link errors (e.g., errors that arise during propagation between the host device and the memory device). Generating the first set of error detection bits, rather than receiving the first set of error detection bits from the host device, may reduce the circuitry and processing complexity at the host device.

The memory device 200 may store the first set of error detection bits (EDB_1) in the memory 205 or elsewhere in the memory device 200 (e.g., in one or more registers, in a local array separate from the memory 205) or both. Storing the error detection bits, rather than address bits, may reduce the storage overhead associated with generating the address match signal.

In some examples, the memory device 200 may include an error detection bit circuit 210-*b* that is configured to generate a second set of error detection bits (EDB_2) based on the read address for the set of data. In some examples, the second set of error detection bits may be parity bits that are generated by XORing the bits of the read address. In some examples, the second set of error detection bits may be cyclic redundancy check (CRC) bits that are generated by dividing the bits of the rad address by another set of bits that represents a polynomial. So, the second set of error detection bits may be based on the read address in that the logic values of the second set of error detection bits may be a function of the logic values of the bits of the read address. Accordingly, the second set of error detection bits may represent the write address. If the first set of error detection bits are parity bits the second set of error detection bits may be parity bits; if the first set of error detection bits are CRC bits the second set of error detection bits may be CRC bits.

In an alternative, the memory device 200 may receive the second set of error detection bits (EDB_2) from the host device (rather than the memory device 200 generating the second set of error detection bits). In such an example, the address match circuitry 220 may omit or disable the error detection bit circuit 210-*b*. Receiving the second set of error detection bits from the host device, rather than generating the first set of error detection bits, may allow the memory device 200 to detect address mismatches that arise due to link errors (e.g., errors that arise during propagation between the host device and the memory device). Generating the second set of error detection bits, rather than receiving the second set of error detection bits from the host device, may reduce the circuitry and processing complexity at the host device.

Figure 4:
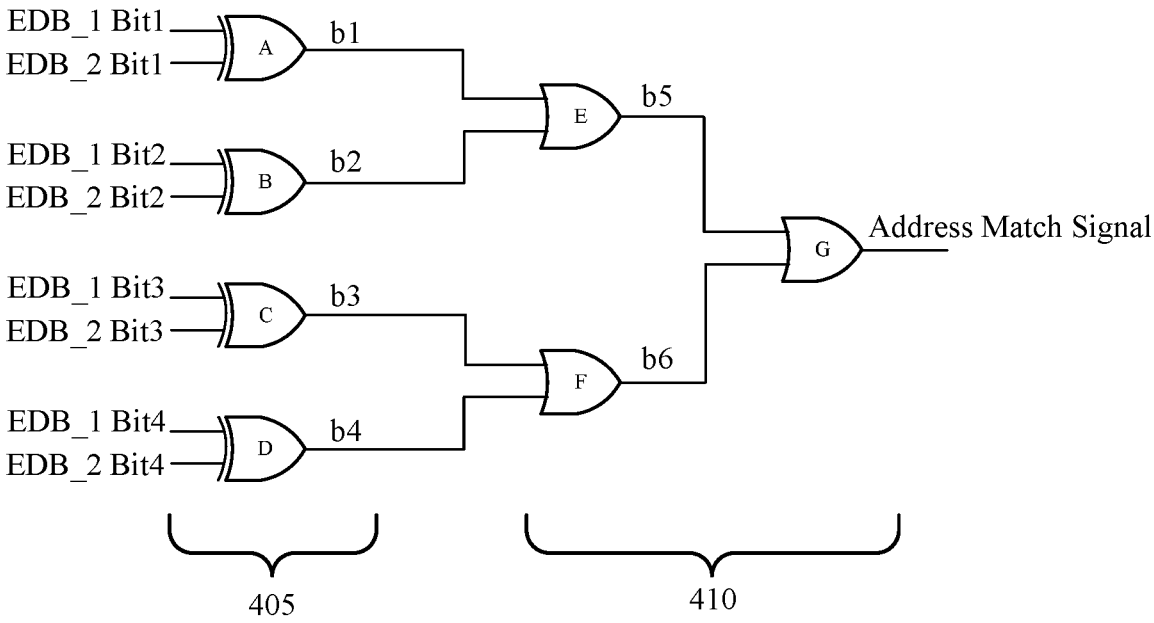
FIG. 4 illustrates an example of a logic circuit that supports address verification at a memory device in accordance with examples as disclosed herein.
Figure 4:

The comparator circuit 240 may be configured to generate an address match signal (e.g., one or more bits) based on the first set of error detection bits and the second set of error detection bits. For example, the comparator circuit 240 may be configured to compare the first set of error detection bits with the second set of error detection bits and generate the address match signal based on the comparison. In some examples, the comparator circuit 240 may be configured to compare the sets of error detection bits by being configured to perform a logic operation (e.g., an XOR operation) on the sets of error detection bits. In such examples, the comparator circuits 240 may generate the address match signal by ORing the bits that results from the XOR operation. An example of the comparator circuit 240 is illustrated in FIG. 4.

The memory device 200 may provide the address match signal to the host device by transmitting the address match signal to the host device or by writing the address match signal to a register for the host device to read. If the address match signal indicates that the data associated with the address match signal was written to and read from different addresses, the host device may discard the data and retransmit a read command for the data or perform another remedial action. For instance, the host device may enter a safety mode. As an example, if the host device is part of a self-driving vehicle, the host device may cause the vehicle to A) slow down and/or pull over to the side of the road or B) transfer control of the vehicle to the driver.

The parity circuit 215-b may be configured to receive the set of data read from the memory 205 and generate a second set of parity bits (Parity_2). The second set of parity bits may be generated based on the set of data read from the memory 205 (e.g., by XORing various combinations of the data bits).

The syndrome circuit 225 may be configured to generate a set of syndrome bits for the codeword based on the first set of parity bits (Parity_1) read from the memory 205 and the second set of parity bits (Parity_2) received from the parity circuit 215-b. For example, the syndrome circuit 225 may XOR each parity bit in the first set of parity bits (Parity_1) with a corresponding parity bit in the second set of parity bits (Parity_2). To illustrate, a first syndrome bit (S0) may be generated by XORing the first parity bit (P0) in the first set of parity bits and the first parity bit (P0) in the second set of parity bits, a second syndrome bit (S1) may be generated by XORing the second parity bit (P1) in the first set of parity bits and the second parity bit (P1) in the second set of parity bits, and so on and so forth. If the codeword has an error the set of syndrome bits may be non-zero; if the codeword is errorless the set of syndrome bits may be zeros.

The correction control circuit 230 may be configured to control the correction circuit 235 based on the set of syndrome bits received from the syndrome circuit 225. For example, if the codeword has an error, the correction control circuit 230 may use the set of syndrome bits to determine a location (e.g., bit position) of the error in the codeword and may indicate the location to the correction circuit 235. The correction circuit 235 may receive the data from the memory 205, correct the error in the data based on the control signaling from the correction control circuit 230, and output the corrected data. Correcting an error may refer to inverting the bit that has the error. The memory device 200 may communicate the corrected data to the host device.

Thus, the memory device 200 may generate an address match signal that indicates whether the write address for a set of data matches the read address for the set of data.

Figure 3:
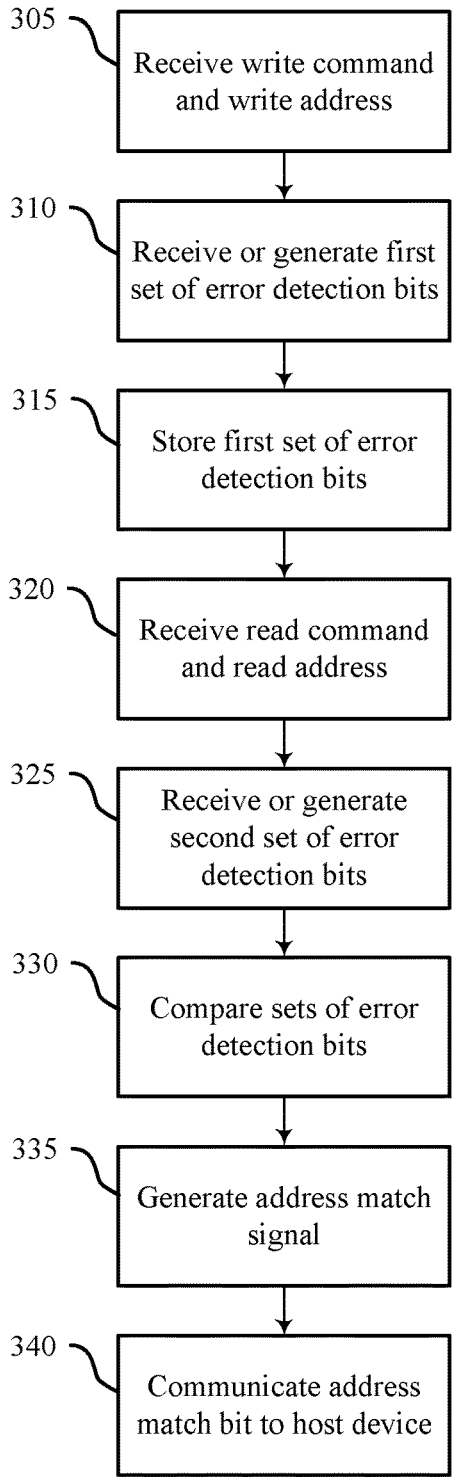
FIG. 3 illustrates an example of a process flow that supports address verification at a memory device in accordance with examples as disclosed herein.

FIG. 3 illustrates an example of a process flow 300 that supports address verification at a memory device in accordance with examples as disclosed herein. Aspects of the process flow 300 may be implemented by a memory device as described herein. For example, aspects of the process flow 300 may be implemented by the memory device 200 as described with reference to FIG. 2. By implementing aspects of the process flow 300, the memory device may generate an address match signal for a set of data.

At 305, the memory device may receive (e.g., from a host device) a write command and a write address associated with a set of data to be written to the memory device. At 310, the memory device may receive or generate a first set of error detection bits that is based on the write address. At 315, the memory device may store the first set of error detection bits (e.g., in the memory 205, in a register, in a local array). The memory device may also store the set of data (e.g., in the memory 205). The memory device may store the set of data at one or more memory cells associated with the write address.

At 320, the memory device may receive a read command and a read address associated with the data. At 325, the memory device may receive or generate a second set of error detection bits that is based on the read address. At 330, the memory device may compare the first set of error detection bits with the second set of error detection bits (e.g., by XORing the first set of error detection bits with the second set of error detection bits). At 335, the memory device may generate an address match signal based on comparing first set of error detection bits with the second set of error detection bits. For example, the memory device may OR the set of bits that results from comparing the sets of error detection bits. At 340, the memory device may communicate the address match bit to the host device.

Thus, the memory device may generate an address match signal for a set of data. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

FIG. 4 illustrates an example of a logic circuit 400 that supports address verification at a memory device in accordance with examples as disclosed herein. The logic circuit 400 may be an example of a comparator circuit 240 as described with reference to FIG. 2. The logic circuit 400 may generate an address match signal based on two sets of error detection bits. In the provided example, the logic circuit 400 is configured to generate an address match signal based on four error detection bits per set. However, the logic circuit 400 may be configured to generate an address match signal based on other quantities of error detection bits.

The logic circuit 400 may include a first quantity of logic gates, such as XOR gates 405, and a second quantity of logic gates, such as OR gates 410. The XOR gates 405 may be configured to receive a first set of error detection bits and a second set of error detection bits. For example, an XOR gate may be configured to receive a bit from the first set of error detection bits and a corresponding bit from the second set of error detection bits.

To illustrate, XOR gate A may be configured to receive bit 1 of the first set of error detection bits (denoted EDB_1 Bit1)

and bit 1 of the second set of error detection bits (denoted EDB_2 Bit1), where bit n refers to the bit in the nth bit-position. XOR gate B may be configured to receive bit 2 of the first set of error detection bits and bit 2 of the second set of error detection bits. XOR gate C may be configured to receive bit 3 of the first set of error detection bits and bit 3 of the second set of error detection bits. And XOR gate D may be configured to receive bit 4 of the first set of error detection bits and bit 4 of the second set of error detection bits.

The XOR gates 405 may be configured to perform a logic operation, such as an XOR operation, on the sets of error detection bits. For example, XOR gate A may be configured to XOR bit 1 of the first set of error detection bits and bit 1 of the second set of error detection bits. XOR gate B may be configured to XOR bit 2 of the first set of error detection bits and bit 2 of the second set of error detection bits. XOR gate C may be configured to XOR bit 3 of the first set of error detection bits and bit 3 of the second set of error detection bits. And XOR gate D may be configured to XOR bit 4 of the first set of error detection bits and bit 4 of the second set of error detection bits. The bit outputted by an XOR gate 405 may be a logic 0 if the input bits match (e.g., have the same logic value, are equal) and may be a logic 1 if the input bits do not match (e.g., have different logic values, are not equal).

The output nodes of the XOR gates 405 may be coupled with input nodes of some of the OR 410 gates such that the OR gates 410 receive the bits outputted by the XOR gates 405. For example, the OR gate E may be configured to receive the bit outputted by XOR gate A (e.g., bit b1) and the bit outputted by XOR gate B (e.g., bit b2). And the OR gate F may be configured to receive the bit outputted by XOR gate C (e.g., bit b3) and the bit outputted by XOR gate D (e.g., bit b4).

The OR gates E and F may be configured to perform a logic operation, such as an OR operation, on the bits outputted by the XOR gates 405. For example, OR gate E may be configured to OR bit b1 and bit b2. And XOR gate F may be configured to OR bit b3 and bit b4. The bit outputted by an OR gate 410 may be a logic 0 if the input bits are logic zeros and may be a logic 1 if any of the input bits are a logic 1.

The OR gate G may be configured to perform a logic operation, such as an OR operation, on the bits outputted by the OR gates E and F. For example, OR gate G may be configured to OR the bit outputted by OR gate E (e.g., bit b5) and the bit outputted by OR gate F (e.g., bit b6). The bit output by the OR gate may be the address match signal.

Thus, the logic circuit 400 may generate an address match signal based on two sets of error detection bits.

Figure 5:
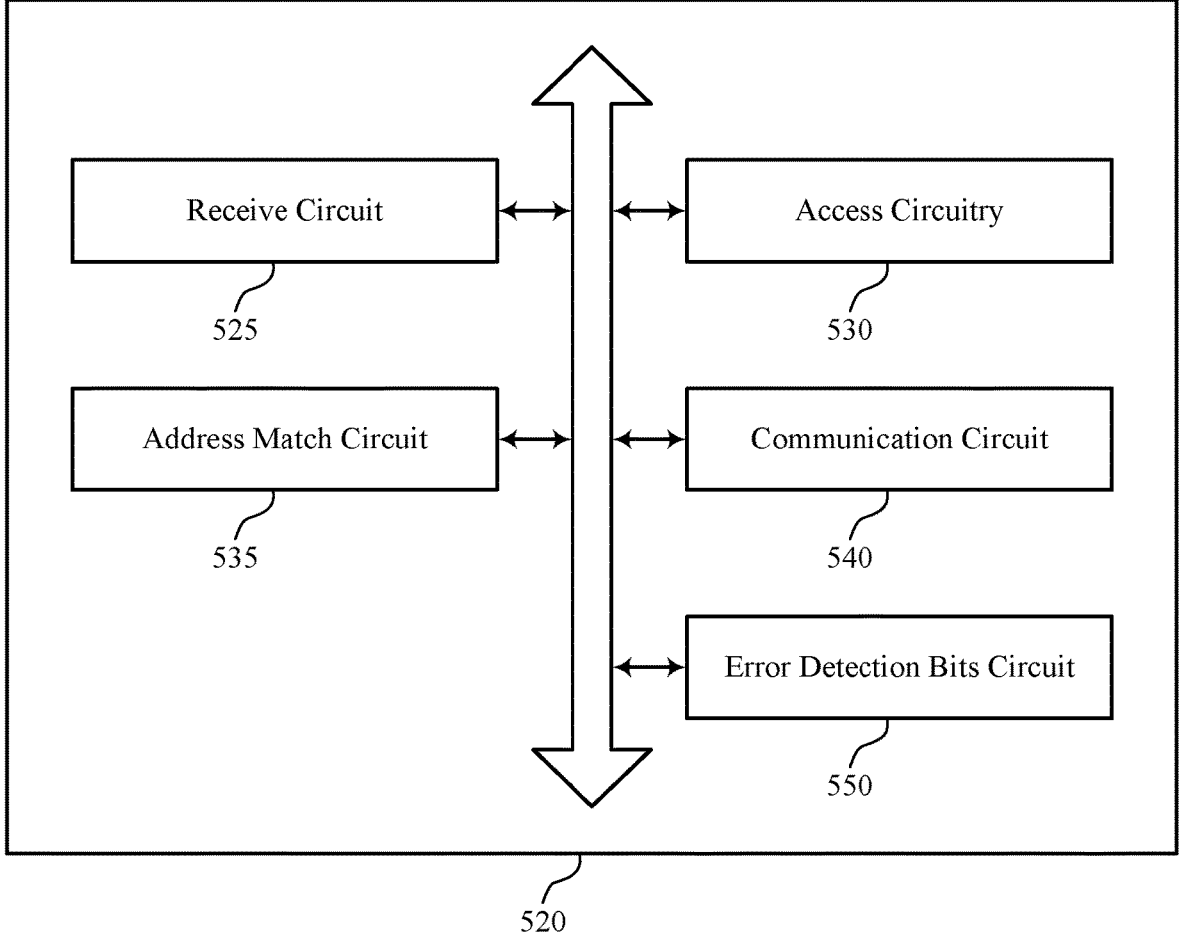
FIG. 5 illustrates a block diagram of a memory device that supports address verification in accordance with examples as disclosed herein.

FIG. 5 illustrates a block diagram 500 of a memory device 520 that supports address verification at a memory device in accordance with examples as disclosed herein. The memory device 520 may be an example of aspects of a memory device as described with reference to FIGS. 1 through 4. The memory device 520, or various components thereof, may be an example of means for performing various aspects of address verification at a memory device as described herein. For example, the memory device 520 may include a receive circuit 525, an access circuitry 530, an address match circuit 535, a communication circuit 540, an error detection bits circuit 550, or any combination thereof. Each of these components may communicate, directly or indirectly, with one another (e.g., via one or more buses).

The receive circuit 525 may be configured as or otherwise support a means for receiving a read command for a read address. The access circuitry 530 may be configured as or otherwise support a means for reading, based at least in part on the read command, data from the read address and a first set of error detection bits that is based at least in part on a write address associated with the data. The address match circuit 535 may be configured as or otherwise support a means for generating, based at least in part on the first set of error detection bits and a second set of error detection bits that is based at least in part on the read address, an address match signal that indicates whether the read address matches the write address. The communication circuit 540 may be configured as or otherwise support a means for providing the data and an indication of the address match signal to a host device.

In some examples, the address match circuit 535 may be configured as or otherwise support a means for comparing the first set of error detection bits with the second set of error detection bits, where the address match signal is generated based at least in part on the comparison.

In some examples, the access circuitry 530 may be configured as or otherwise support a means for performing a first logic operation on the first set of error detection bits and the second set of error detection bits to generate a set of bits. In some examples, the access circuitry 530 may be configured as or otherwise support a means for performing a second logic operation on the set of bits, where the address match signal is generated based at least in part on performing the second logic operation.

In some examples, the first logic operation includes an exclusive-OR (XOR) operation. In some examples, the second logic operation includes an OR operation.

In some examples, the receive circuit 525 may be configured as or otherwise support a means for receiving the second set of error detection bits based at least in part on receiving the read command, where the address match signal is generated based at least in part on receiving the second set of error detection bits.

In some examples, the receive circuit 525 may be configured as or otherwise support a means for receiving the data and the first set of error detection bits. In some examples, the access circuitry 530 may be configured as or otherwise support a means for storing the data and the first set of error detection bits.

In some examples, the error detection bits circuit 550 may be configured as or otherwise support a means for generating the second set of error detection bits based at least in part on the read address.

In some examples, the receive circuit 525 may be configured as or otherwise support a means for receiving the data and the write address. In some examples, the error detection bits circuit 550 may be configured as or otherwise support a means for generating the first set of error detection bits based at least in part on the write address. In some examples, the access circuitry 530 may be configured as or otherwise support a means for storing the data and the first set of error detection bits.

In some examples, the first set of error detection bits and the second set of error detection bits each includes parity bits or CRC bits.

In some examples, to support providing the indication of the address match signal, the communication circuit 540 may be configured as or otherwise support a means for transmitting the indication of the address match signal to the host device. In some examples, to support providing the indication of the address match signal, the access circuitry 530 may be configured as or otherwise support a means for writing the indication of the address match signal to a register.

FIG. 6 illustrates a flowchart showing a method 600 that supports address verification at a memory device in accordance with examples as disclosed herein. The operations of method 600 may be implemented by a memory device or its components as described herein. For example, the operations of method 600 may be performed by a memory device as described with reference to FIGS. 1 through 5. In some examples, a memory device may execute a set of instructions to control the functional elements of the device to perform the described functions. Additionally, or alternatively, the memory device may perform aspects of the described functions using special-purpose hardware.

At 605, the method may include receiving a read command for a read address. The operations of 605 may be performed in accordance with examples as disclosed herein. In some examples, aspects of the operations of 605 may be performed by a receive circuit 525 as described with reference to FIG. 5.

At 610, the method may include reading, based at least in part on the read command, data from the read address and a first set of error detection bits that is based at least in part on a write address associated with the data. The operations of 610 may be performed in accordance with examples as disclosed herein. In some examples, aspects of the operations of 610 may be performed by an access circuitry 530 as described with reference to FIG. 5.

At 615, the method may include generating, based at least in part on the first set of error detection bits and a second set of error detection bits that is based at least in part on the read address, an address match signal that indicates whether the read address matches the write address. The operations of 615 may be performed in accordance with examples as disclosed herein. In some examples, aspects of the operations of 615 may be performed by an address match circuit 535 as described with reference to FIG. 5.

At 620, the method may include providing the data and an indication of the address match signal to a host device. The operations of 620 may be performed in accordance with examples as disclosed herein. In some examples, aspects of the operations of 620 may be performed by a communication circuit 540 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a read command for a read address; reading, based at least in part on the read command, data from the read address and a first set of error detection bits that is based at least in part on a write address associated with the data; generating, based at least in part on the first set of error detection bits and a second set of error detection bits that is based at least in part on the read address, an address match signal that indicates whether the read address matches the write address; and providing the data and an indication of the address match signal to a host device.

Aspect 2: The method, apparatus, or non-transitory computer-readable medium of aspect 1, further including operations, features, circuitry, logic, means, or instructions, or any combination thereof for comparing the first set of error detection bits with the second set of error detection bits, where the address match signal is generated based at least in part on the comparison.

Aspect 3: The method, apparatus, or non-transitory computer-readable medium of any of aspects 1 through 2, further including operations, features, circuitry, logic, means, or instructions, or any combination thereof for performing a first logic operation on the first set of error detection bits and the second set of error detection bits to generate a set of bits and performing a second logic operation on the set of bits, where the address match signal is generated based at least in part on performing the second logic operation.

Aspect 4: The method, apparatus, or non-transitory computer-readable medium of aspect 3, where the first logic operation includes an exclusive-OR (XOR) operation and the second logic operation includes an OR operation.

Aspect 5: The method, apparatus, or non-transitory computer-readable medium of any of aspects 1 through 4, further including operations, features, circuitry, logic, means, or instructions, or any combination thereof for receiving the second set of error detection bits based at least in part on receiving the read command, where the address match signal is generated based at least in part on receiving the second set of error detection bits.

Aspect 6: The method, apparatus, or non-transitory computer-readable medium of aspect 5, further including operations, features, circuitry, logic, means, or instructions, or any combination thereof for receiving the data and the first set of error detection bits and storing the data and the first set of error detection bits.

Aspect 7: The method, apparatus, or non-transitory computer-readable medium of any of aspects 1 through 6, further including operations, features, circuitry, logic, means, or instructions, or any combination thereof for generating the second set of error detection bits based at least in part on the read address.

Aspect 8: The method, apparatus, or non-transitory computer-readable medium of aspect 7, further including operations, features, circuitry, logic, means, or instructions, or any combination thereof for receiving the data and the write address; generating the first set of error detection bits based at least in part on the write address; and storing the data and the first set of error detection bits.

Aspect 9: The method, apparatus, or non-transitory computer-readable medium of any of aspects 1 through 8, where the first set of error detection bits and the second set of error detection bits each includes parity bits or CRC bits.

Aspect 10: The method, apparatus, or non-transitory computer-readable medium of any of aspects 1 through 9, where and the method, apparatuses, and non-transitory computer-readable medium includes operations, features, circuitry, logic, means, or instructions, or any combination thereof for transmitting the indication of the address match signal to the host device and writing the indication of the address match signal to a register.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 11: An apparatus, including: a first set of logic gates configured to generate a first set of error detection bits based at least in part on a write address for data; a second set of logic gates configured to generate a second set of error detection bits based at least in part on a read address for the data; and a third set of logic gates configured to generate, based at least in part on the first set of error detection bits and the second set of error detection bits, an address match signal that indicates whether the read address matches the write address.

Aspect 12: The apparatus of aspect 11, where the third set of logic gates includes: a first subset of logic gates configured to perform a first logic operation on the first set of error detection bits and the second set of error detection bits; and a second subset of logic gates configured to perform a second logic operation on a set of bits outputted by the first subset of logic gates.

Aspect 13: The apparatus of aspect 12, where the first subset of logic gates includes exclusive-OR (XOR) gates, and the second subset of logic gates includes OR gates.

Aspect 14: The apparatus of any of aspects 11 through 13, where the third set of logic gates includes: a first exclusive-OR (XOR) gate configured to perform an XOR operation on a first bit of the first set of error detection bits and a first bit of the second set of error detection bits; and a second exclusive XOR gate configured to perform an XOR operation on a second bit of the first set of error detection bits and a second bit of the second set of error detection bits.

Aspect 15: The apparatus of aspect 14, where the third set of logic gates includes: an OR gate configured to perform an OR operation on a first bit outputted by the first XOR gate and a second bit outputted by the second XOR gate.

An apparatus is described. The following provides an overview of aspects of the apparatus as described herein:

Aspect 16: An apparatus, including: a memory; and a controller coupled with the memory and configured to cause the apparatus to: receive a read command for a read address; read, based at least in part on the read command, data from the read address in the memory and a first set of error detection bits that is based at least in part on a write address associated with the data; generate, based at least in part on the first set of error detection bits and a second set of error detection bits that is based at least in part on the read address, an address match signal that indicates whether the read address matches the write address; and provide the data and an indication of the address match signal to a host device.

Aspect 17: The apparatus of aspect 16, where the controller is configured to cause the apparatus to: compare the first set of error detection bits with the second set of error detection bits, where the address match signal is generated based at least in part on the comparison.

Aspect 18: The apparatus of any of aspects 16 through 17, where the controller is configured to cause the apparatus to: perform a first logic operation on the first set of error detection bits and the second set of error detection bits to generate a set of bits; and perform a second logic operation on the set of bits, where the address match signal is generated based at least in part on performing the second logic operation.

Aspect 19: The apparatus of aspect 18, where the first logic operation includes an exclusive-OR (XOR) operation, and the second logic operation includes an OR operation.

Aspect 20: The apparatus of any of aspects 16 through 19, where the controller is configured to cause the apparatus to: receive the second set of error detection bits based at least in part on receiving the read command, where the address match signal is generated based at least in part on receiving the second set of error detection bits.

Aspect 21: The apparatus of aspect 20, where the controller is configured to cause the apparatus to: receive the data and the first set of error detection bits; and store the data and the first set of error detection bits.

Aspect 22: The apparatus of any of aspects 16 through 21, where the controller is configured to cause the apparatus to: generate the second set of error detection bits based at least in part on the read address.

Aspect 23: The apparatus of aspect 22, where the controller is configured to cause the apparatus to: receive the data and the write address; generate the first set of error detection bits based at least in part on the write address; and store the data and the first set of error detection bits.

Aspect 24: The apparatus of any of aspects 16 through 23, where the first set of error detection bits and the second set of error detection bits each includes parity bits or CRC bits.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and micro-wave, then the coaxial cable, fiber optic cable, twisted pair, digital subscriber line (DSL), or wireless technologies such as infrared, radio, and microwave are included in the defi-nition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
receiving, from a host system, a write command for a write address and a first set of error detection bits for protecting the write address;
generating a set of parity bits for protecting data associ-ated with the write command;
storing, based at least in part on the generating, the first set of error detection bits and a codeword comprising the data and the set of parity bits, the first set of error detection bits being separable from the codeword;
receiving, from the host system, a read command for a read address and a second set of error detection bits for protecting the read address;
reading, based at least in part on the read command, the first set of error detection bits and the codeword com-prising the data and the set of parity bits;
generating, based at least in part on the received first set of error detection bits for protecting the write address and the received second set of error detection bits for protecting the read command, an address match signal that indicates whether the read address or the write address experienced a link error; and
providing, in response to the read command, the data and an indication of the address match signal.

2. The method of claim 1, further comprising:
comparing the first set of error detection bits with the second set of error detection bits, wherein the address match signal is generated based at least in part on the comparison.

3. The method of claim 1, further comprising:
performing a first logic operation on the first set of error detection bits and the second set of error detection bits to generate a set of bits; and
performing a second logic operation on the set of bits, wherein the address match signal is generated based at least in part on performing the second logic operation.

4. The method of claim 3, wherein the first logic operation comprises an exclusive-OR (XOR) operation, and wherein the second logic operation comprises an OR operation.

5. The method of claim 1, wherein the second set of error detection bits is received based at least in part on receiving the read command, and wherein the address match signal is generated based at least in part on receiving the second set of error detection bits.

6. The method of claim 5, further comprising:
receiving the data and the first set of error detection bits based at least in part on receiving the write command.

7. The method of claim 1, wherein the second set of error detection bits are based at least in part on the read address.

8. The method of claim 1, further comprising:
writing the indication of the address match signal to a register.

9. An apparatus, comprising:
a first set of logic gates configured to generate a first set of error detection bits for protecting a write address for data, the first set of error detection bits based at least in part on the write address for data;
a second set of logic gates configured to generate a second set of error detection bits for protecting a read address for the data, the second set of error detection bits based at least in part on the read address for the data; and
a third set of logic gates configured to generate, based at least in part on the first set of error detection bits and the second set of error detection bits, an address match signal that indicates whether the read address matches the write address, the third set of logic gates compris-ing:
a plurality of exclusive-OR (XOR) gates each config-ured to perform an XOR operation on a respective bit of the first set of error detection bits for protecting the write address and on a respective bit of the second set of error detection bits for protecting the read address;
a first OR gate coupled with a first subset of XOR gates of the plurality of XOR gates and configured to perform an OR operation on a first plurality of bits outputted by the first subset of XOR gates;
a second OR gate coupled with a second subset of XOR gates of the plurality of XOR gates and configured to perform an OR operation on a second plurality of bits outputted by the second subset of XOR gates; and
a third OR gate coupled with the first OR gate and the second OR gate and configured to perform an OR operation on a third plurality of bits outputted by the first OR gate and the second OR gate.

10. The apparatus of claim 9, wherein the plurality of XOR gates comprises:
a first XOR gate configured to perform an XOR operation on a first bit of the first set of error detection bits and a first bit of the second set of error detection bits; and
a second XOR gate configured to perform an XOR operation on a second bit of the first set of error detection bits and a second bit of the second set of error detection bits.

11. The apparatus of claim 10, wherein the first OR gate is configured to perform an OR operation on a first output bit outputted by the first XOR gate and a second output bit outputted by the second XOR gate.

12. An apparatus, comprising:
one or more memories; and
one or more controllers coupled with the one or more memories and configured to cause the apparatus to:
receive, from a host system, a write command for a write address and a first set of error detection bits for protecting the write address;
generate a set of parity bits for protecting data associ-ated with the write command;
store, at the one or more memories, based at least in part on the write command, the first set of error detection bits and a codeword comprising the data and the set of parity bits, the first set of error detection bits being separable from the codeword;

receive, from the host system, a read command for a read address and a second set of error detection bits for protecting the read address;

read, from the one or more memories based at least in part on the read command, the first set of error detection bits and the codeword comprising the data and the set of parity bits;

generate, based at least in part on the received first set of error detection bits for protecting the write address and the received second set of error detection bits for protecting the read command, an address match signal that indicates whether the read address or the write address experienced a link error; and provide, in response to the read command, the data and an indication of the address match signal.

13. The apparatus of claim 12, wherein the one or more controllers are configured to cause the apparatus to:

compare the first set of error detection bits with the second set of error detection bits, wherein the address match signal is generated based at least in part on the comparison.

14. The apparatus of claim 12, wherein the one or more controllers are configured to cause the apparatus to:

perform a first logic operation on the first set of error detection bits and the second set of error detection bits to generate a set of bits; and perform a second logic operation on the set of bits, wherein the address match signal is generated based at least in part on performing the second logic operation.

15. The apparatus of claim 14, wherein the first logic operation comprises an exclusive-OR (XOR) operation, and wherein the second logic operation comprises an OR operation.

16. The apparatus of claim 12, wherein the second set of error detection bits is received based at least in part on receiving the read command, and wherein the address match signal is generated based at least in part on receiving the second set of error detection bits.

17. The apparatus of claim 16, wherein the one or more controllers are configured to cause the apparatus to:

receive the data and the first set of error detection bits based at least in part on receiving the write command.

18. The apparatus of claim 12, wherein the second set of error detection bits are based at least in part on the read address.

19. The apparatus of claim 12, wherein the first set of error detection bits and the second set of error detection bits each comprises parity bits or cyclic redundancy check (CRC) bits.

* * * * *